United States Patent
Kincaid et al.

(10) Patent No.: US 12,404,362 B2
(45) Date of Patent: Sep. 2, 2025

(54) CURABLE RESIN SYSTEM

(71) Applicant: Huntsman Advanced Materials Americas LLC, The Woodlands, TX (US)

(72) Inventors: Derek Kincaid, Spring, TX (US); Dong Le, Richmond, TX (US); David Lanham Johnson, The Woodlands, TX (US)

(73) Assignee: HUNTSMAN ADVANCED MATERIALS AMERICAS LLC

( * ) Notice: Subject to any disclaimer, the term of this patent is extended or adjusted under 35 U.S.C. 154(b) by 299 days.

(21) Appl. No.: 16/500,415

(22) PCT Filed: Apr. 18, 2018

(86) PCT No.: PCT/US2018/028157
§ 371 (c)(1),
(2) Date: Oct. 3, 2019

(87) PCT Pub. No.: WO2018/195192
PCT Pub. Date: Oct. 25, 2018

(65) Prior Publication Data
US 2020/0123310 A1    Apr. 23, 2020

Related U.S. Application Data

(60) Provisional application No. 62/486,514, filed on Apr. 18, 2017.

(51) Int. Cl.
| | |
|---|---|
| C08G 59/32 | (2006.01) |
| B29C 70/06 | (2006.01) |
| C08G 59/50 | (2006.01) |
| C08J 5/04 | (2006.01) |
| B29K 63/00 | (2006.01) |

(52) U.S. Cl.
CPC ......... C08G 59/3227 (2013.01); B29C 70/06 (2013.01); C08G 59/5033 (2013.01); C08J 5/04 (2013.01); B29K 2063/00 (2013.01); C08J 2363/00 (2013.01)

(58) Field of Classification Search
CPC .................. C08G 59/5003; C08G 59/3227
See application file for complete search history.

(56) References Cited

U.S. PATENT DOCUMENTS

| | | |
|---|---|---|
| 3,856,752 A | 12/1974 | Bateman et al. |
| 3,983,092 A | 9/1976 | Bateman et al. |
| 4,540,769 A | 9/1985 | Dobinson et al. |
| 4,900,848 A | 2/1990 | Saito et al. |
| 4,957,995 A | 9/1990 | Saito et al. |
| 4,992,228 A | 2/1991 | Heck et al. |
| 5,017,674 A | 5/1991 | Tada et al. |
| 5,080,851 A | 1/1992 | Flonc et al. |
| 5,280,069 A | 1/1994 | Dobinson et al. |
| 5,698,318 A | 12/1997 | Burton et al. |
| 9,123,689 B2 | 9/2015 | Takeda et al. |
| 2003/0064228 A1 | 4/2003 | Oosedo et al. |
| 2006/0173141 A1 | 8/2006 | Ando et al. |
| 2013/0225788 A1 | 8/2013 | Meegan |

FOREIGN PATENT DOCUMENTS

| | | |
|---|---|---|
| EP | 0241931 A1 | 10/1987 |
| WO | 2017015376 A1 | 1/2017 |

*Primary Examiner* — Megan McCulley
(74) *Attorney, Agent, or Firm* — HUNTSMAN ADVANCED MATERIALS AMERICAS LLC; David K. Wooten

(57) ABSTRACT

The present disclosure provides a curable resin system containing an alkylated glycidyl amine and a phenylindane diamine. The curable resin system may be cured at relatively low temperatures to produce cured products having desirable physical, thermal and chemical properties for use in various applications including composites for the aerospace and automotive industries.

11 Claims, No Drawings

CURABLE RESIN SYSTEM

CROSS-REFERENCE TO RELATED APPLICATIONS

This application is the National Phase of International Application PCT/US2018/028157 filed Apr. 18, 2018 which designated the U.S, in which claims the benefit of Provisional Application Ser. No. 62/486,514, filed Apr. 18, 2017. The noted applications are incorporated herein by reference.

STATEMENT REGARDING FEDERALLY SPONSORED RESEARCH OR DEVELOPMENT

Not applicable.

FIELD OF INVENTION

This disclosure relates to a curable resin system containing an epoxy component comprising an alkylated glycidyl amine and a curing component comprising a phenylindane diamine. The curable resin system is useful in a variety of applications, for example, in the manufacture of composites for the aerospace and automotive industries.

BACKGROUND

Curable resin compositions containing epoxy resins are used in a number of processes to form structural composites. For example, such compositions may be used in molding processes including those known as resin transfer molding (RTM), vacuum-assisted resin transfer molding (VARTM), Seeman Composites Resin Infusion Molding Process (SCRIMP), reaction injection molding (RIM) processes and liquid compression molding (LCM). In each of these processes, the curable resin composition is applied to a reinforcing agent and cured in the presence of the reinforcing agent. A composite is then formed having a continuous polymer phase (formed from the cured resin) in which the reinforcing agent is dispersed.

The various processes above can be used to produce a wide range of products. For instance, the molding processes (such as RTM, VARTM, SCRIMP, RIM and LCM) can be used to produce high strength parts useful, for example, in automobile and aircraft components. In the RTM, VARTM and SCRIMP processes, the part is formed by inserting a woven or matted fiber preform into a mold cavity, closing the mold, injecting the resin into the mold and hardening the resin. In the RIM process, the woven or matted fiber preform may be inserted in the mold beforehand as just described, or it can be injected into the mold together with the curable resin composition. In the LCM process, the reactive mixture is applied directly to a fiber preform or stack without injection, but by spraying or by laying it down as "bands" of system, which are being fed through a wider slit die having a width of 1 cm to 50 cm or more.

As is the case with many other manufacturing processes, the economics of these composite manufacturing processes is heavily dependent on operating rates. For molding processes, operating rates are often expressed in terms of "cycle time". Cycle time refers to the time required to produce a composite part in the mold and prepare the mold to make the composite part. Cycle time directly affects the number of composite parts that can be made on a mold per unit time. Longer cycle times increase manufacturing costs because overhead costs (facilities and labor, among others) are greater per part produced. If greater production capacity is needed, capital costs are also increased, due to the need for more molds and other processing equipment. For these reasons, there is often a desire to shorten cycle times. When a curable composition containing an epoxy resin is used in the molding processes described above, the predominant component of cycle time is the amount of time required for the resin to cure. Long cure times are often required, especially if the part is large or complex. Therefore, cycle times and production costs can be reduced if the time required for the resin to cure can be shortened.

Faster curing can be promoted through the use of catalysts and, in some cases, highly reactive hardeners. But there are problems associated with faster curing systems such as these. One problem is reactivity—systems that cure more rapidly tend to develop high viscosities very rapidly. This becomes a very significant problem as one increases the reactivity of the system more and more to reduce cure times as much as possible. If the system cures too rapidly, it becomes difficult or impossible to produce parts that have acceptable quality. The system builds viscosity so quickly that it can become difficult to fill the mold, especially when making larger parts. Higher operating pressures become needed, leading to greater equipment and operating costs. Even in smaller parts, visible flow lines and voids often form as the curing polymer flows between and around the fibers. These defects lead to a loss of physical, thermal and mechanical properties in the part.

The problem of premature viscosity increase is especially acute in some fiber-reinforced composite manufacturing processes. This is because the fibers are often at least partially pre-heated. The introduction of the curable composition into the mold exposes the resin matrix composition to rapid localized heating at the points of contact with the heated fibers. This results in rapid localized curing and concomitant localized increases in viscosity. These localized viscosity increases favor the propensity to form defective parts.

Delayed action catalysts have been tried in attempts to circumvent these problems. However, many delayed action catalysts simply do not provide the short demold times that are needed. Other delayed action catalysts become activated at temperatures that are at or near the temperature of the fibers in the mold when the resin is injected. In the latter case, the delayed action catalyst can become locally activated at points where the resin contacts the fibers, leading to localized curing and viscosity increases, which in turn leads to defects in the parts.

Another important consideration is the glass transition temperature of the cured composition. For curing epoxy resin matrix systems, the glass transition temperature increases as the polymerization reactions proceed. It is generally desirable for the resin to develop a glass transition temperature in excess of the mold temperature, so the part can be demolded without damage. In some cases, the curable composition must additionally achieve a glass transition temperature that is necessary for the subsequently formed composite part to perform properly in its intended use. Therefore, in addition to the curing attributes already described, the epoxy-based system must be one that can attain the necessary glass transition temperature upon full cure. In some applications it is highly desirable that this necessary glass transition temperature be achieved during the molding process itself (i.e., without the need for an additional post-curing step), while still attaining the needed short demold time.

Accordingly, curable epoxy-based compositions having desirable physical, thermal and chemical properties not suffering from the above drawbacks would be desirable in the art. These needs are addressed by the embodiments of the present disclosure as described below and defined by the claims that follow.

SUMMARY

The present disclosure provides a curable resin system that includes an epoxy component containing an alkylated glycidyl amine and a curing component containing a phenylindane diamine. In one embodiment, the curable resin system exhibits a high latency with a degree of cure of about 80% or higher when cured at low temperature and provides a cured product exhibiting desirable thermal and mechanical properties.

The curable resin system according to the present disclosure may be used in a variety of applications such as in a coating, adhesive or sealant. In one embodiment, the curable resin system may be used in the production of composite materials for use in various industries, such as in the aerospace, automotive or electronic industries.

DETAILED DESCRIPTION

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability, and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e., to at least one) of the grammatical object of the article. By way of example, "an alkylated glycidyl amine" means one alkylated glycidyl amine or more than one alkylated glycidyl amine. The phrases "in one embodiment," "according to one embodiment," and the like generally mean the particular feature, structure, or characteristic following the phrase is included in at least one embodiment of the present invention, and may be included in more than one embodiment of the present disclosure. Importantly, such phases do not necessarily refer to the same embodiment. If the specification states a component or feature "may", "can", "could", or "might" be included or have a characteristic, that particular component or feature is not required to be included or have the characteristic.

The term "aliphatic" means those compounds which are not aromatic.

The term "alkylated glycidyl amine" refers to a glycidyl amine having an alkyl group.

The term "alkyl" as used herein refers to straight chain and branched alkyl groups and cycloalkyl groups. In some embodiments, the alkyl group may have from 1 to about 20 carbon atoms, or from 1 to 12 carbons or, even in some embodiments from 1 to 8 carbon atoms. Examples of straight chain alkyl and cycloalkyl groups with from 1 to 8 carbon atoms include methyl, ethyl, n-propyl, n-butyl, n-pentyl, n-hexyl, n-heptyl, n-octyl groups and cyclopropyl, cyclobutyl, cyclopentyl and cyclohexyl groups. Examples of branched alkyl groups include, but are not limited to, isopropyl, isobutyl, sec-butyl, t-butyl, neopentyl, isopentyl, and 2,2-dimethylpropyl groups. As used herein, the term "alkyl" encompasses all branched chain forms of alkyl.

As used herein, the term "curing" or "cure" refers to the hardening of an epoxy resin by chemical cross-linking. The term "curable" means that the composition or system is capable of being subjected to conditions which will render the composition or system to a cured or thermoset state or condition.

The term "curing degree" or "degree of curing" is to be understood as an expression of how far the curing reaction has proceeded between its start (where no reaction at all has taken place) and its end (where the reaction has proceeded as far as possible, the system being fully cured then).

The term "epihalohydrin" refers to compounds having the following structure:

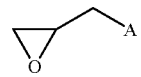

where A is a halogen atom, such as fluorine, chlorine, bromine, iodine, etc. Epichlorohydrin is one example of an epihalohydrin.

The term "substantially free" means, when used with reference to the substantial absence of a material in a composition, that such a material is not present, or if at all, as an incidental impurity or by-product. In other words, the material does not affect the properties of the composition.

The present disclosure generally relates to a curable resin system containing (i) an epoxy component comprising an alkylated glycidyl amine obtained from the reaction of an epihalohydrin and an amine having at least two reactive hydrogens selected from the group consisting of an aliphatic amine, an alkyl aromatic amine, an alkyl aminophenol and a mixture thereof, and (ii) a curing component comprising a phenylindane diamine. Applicants have surprisingly found that such a curable resin system not only exhibits high latency (i.e., temperature stability) but also rapidly cures at low temperatures. Furthermore, the curable resin system, upon curing, demonstrates high thermal resistance properties which are necessary for advanced composite applications. Thus, the curable resin system of the present disclosure provides reactive chemistry solutions to meet the thermal, mechanical and rheology requirements for composite applications while also providing improved process latency and rapid curing capabilities. Such rapid curing capabilities result in faster processing throughput and increasingly favorable manufacturing economics.

While the curable resin system of the present disclosure may be used alone, the system is generally combined with a fibrous support to form composite materials. The composite materials may be in the form of a prepreg or cured final part. Although the composite materials may be used for any intended purpose, in one embodiment they are used in aerospace applications for structural and non-structural aircraft components and primary aircraft structures or parts. Structural components include the fuselage, wings, empennage and supporting structures such as spars, ribs and stringers. Non-structural components can include the interior of aerospace vehicles. In addition, the composite materials may be used to make primary aircraft structures. Primary aircraft structures or parts are those elements of either fixed-wing or rotary wing aircraft that undergo significant stress during flight and which are essential for the aircraft to maintain controlled flight. The composite materials may also be used to make "load-bearing" parts and structures in general.

As described above, the curable resin system includes an epoxy component comprising an alkylated glycidyl amine. According to one embodiment, the alkylated glycidyl amine is a compound having not less than two epoxy groups in its molecule. In another embodiment, the alkylated glycidyl amine is a compound having not less than three epoxy groups in its molecule or not less than four epoxy groups in its molecule. In yet another embodiment, the alkylated glycidyl amine is a compound having no more than five epoxy groups in its molecule. In still yet another embodiment, the alkylated glycidyl amine is a compound having two to five epoxy groups in its molecule or two to four epoxy groups in its molecule or even two to three epoxy groups in its molecule. In a further embodiment, the alkylated glycidyl amine is a compound having three to five epoxy groups in its molecule or three to four epoxy groups in its molecule.

As described above, the alkylated glycidyl amine may be obtained by reacting an epihalohydrin with an amine having at least two reactive hydrogens selected from an aliphatic amine, an alkyl aromatic amine, an alkyl aminophenol and a mixture thereof. In another embodiment, the alkylated glycidyl amine may be obtained by reacting an epihalohydrin with an amine having at least two reactive hydrogens selected from an aliphatic amine, an alkyl aminophenol and a mixture thereof. In still another embodiment, the alkylated glycidyl amine may be obtained by reacting an epihalohydrin with an amine having at least two reactive hydrogens selected from an alkyl aromatic amine, an alkyl aminophenol and a mixture thereof. In still yet another embodiment, the alkylated glycidyl amine may be obtained by reacting an epihalohydrin with an amine having at least two reactive hydrogens selected from an alkyl aromatic amine. In a further embodiment, the alkylated glycidyl amine may be obtained by reacting an epihalohydrin with an amine having at least two reactive hydrogens selected from an alkyl aminophenol.

According to one embodiment, the epihalohydrin is epichlorohydrin or epibromohydrin. In one preferred embodiment, the epihalohydrin is epichlorohydrin.

In another embodiment, the amine having at least two reactive hydrogens is an aliphatic amine. According to one embodiment, the aliphatic amine is a monoamine. Examples of monoamines include, but are not limited to, methylamine, n-hexylamine, cyclohexylamine, aminonorbornane, N,N-diethyltrimethylenediamine and any combination thereof.

According to another embodiment, the aliphatic amine is a di- or polyamine. Examples of di- and polyamines include, but are not limited to, ethylene diamine, diethylene triamine, triethylene tetramine, tetraethylene pentamine, pentaethylene hexamine, dipropylene triamine, tributylene tetramine, hexamethylene diamine, dihexamethylene triamine, 1,2-propane diamine, 1,3-propane diamine, 1,2-butane diamine, 1,3-butane diamine, 1,4-butane diamine, 1,5-pentane diamine, 1,6-hexane diamine, 2-methyl-1,5-pentanediamine, 2,5-dimethyl-2,5-hexanediamine, bis(aminomethyl) norbornane, bis(aminopropyl)ether, bis(aminopropyl)sulfide, isophorone diamine, 1,4-bis(4-aminophenyl)-trans-cyclohexane, 1,1-bis(4-aminophenyl)cyclohexane, 1,2-diaminocyclohexane, 1,4-bis(aminocyclohexyl)methane, 1,3-bis(aminomethyl)cyclohexane, 1,4-bis(aminomethyl) cyclohexane, 1,4-cyclohexanediamine, 2,2'-bis(4-aminocyclohexyl)propane, 4-(2-aminopropan-2-yl)-1-methylcyclohexan-1-amine(menthane diamine) and any combination thereof.

According to another embodiment, the amine is an alkyl aromatic amine. In another embodiment, the alkyl aromatic amine is an alkyl aromatic polyamine. Examples of alkyl aromatic polyamines include, but are not limited to, 2,4-diaminotoluene, 2,6-diaminotoluene, 4,4'-methylene-bis-(3-chloro-2,6-diethylaniline), 4,4'-methylene-bis-(2,6-diethylaniline), 5-amino-3-(4'-aminophenyl)-1,1,3-trimethylindane, 6-amino-3-(4'-aminophenyl)-1,1,3-trimethylindane, alkylated derivatives of 4,4'-diaminodiphenyl methane such as 3,3'-diisopropyl-4,4'-diaminodiphenyl methane, 3,3'-dimethyl-4,4'-diaminodiphenyl methane, 3,3'-diethyl-4,4'-diaminodiphenyl methane, diethyl toluenediamine and mixtures thereof.

According to still another embodiment, the amine is an alkyl aminophenol. In one embodiment, the alkyl aminophenol is a compound having the structure

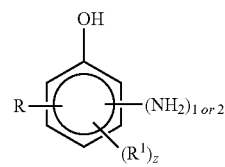

where R is an alkyl group having from 1 to 12 carbon atoms, $R^1$ is an alkyl group having from 1 to 12 carbon atoms and z is an integer of 0 or 1.

According to one embodiment, z is 0 and R is an alkyl group having from 1 to 8 carbon atoms. Examples of R groups include, but are not limited to, methyl, ethyl, propyl, isopropyl and butyl groups.

According to another embodiment, z is 1, R is an alkyl group having from 1 to 8 carbon atoms and $R^1$ is an alkyl group having from 1 to 8 carbon atoms. Examples of R and $R^1$ groups include, but are not limited to, methyl, ethyl, propyl, isopropyl and butyl groups.

In still another embodiment, the alkyl aminophenol is a compound having the structure

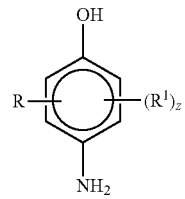

where R, $R^1$ and z are defined as above. In one embodiment, R and $R^1$, if z is 1, are ortho to the OH group, while in another embodiment, R and $R^1$, if z is 1, are ortho to the $NH_2$ group.

In yet another embodiment, the alkyl aminophenol is a compound having the structure

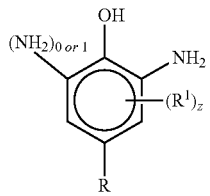

where R, $R^1$ and z are defined as above.

The alkylated glycidyl amine can be prepared by any suitable method known to those skilled in the art, such as by the methods disclosed in U.S. Pat. Nos. 4,540,769, 4,900,848, 5,017,674 and 5,280,069. These patents are fully incorporated herein by reference with respect to their disclosure pertaining to the methods for the preparation of such materials. For example, one suitable method includes reaction of the amine and the epihalohydrin to form the corresponding halohydrin amine of said amine followed by dehydrohalogenation of the resultant halohydrin amine. In the preparation of the alkylated glycidyl amine, the amine is typically reacted with an epihalohydrin in the presence or absence of a suitable catalyst and in the presence or absence of a suitable solvent at a temperature from about 0° C. to about 150° C., or from about 20° C. to about 100° C., or even from about 40° C. to about 80° C.; and, at pressures from about 30 mm Hg vacuum to about 100 psia, or from about 65 mm Hg vacuum to about 50 psia, or even from about atmospheric pressure to about 20 psia; and, for a time sufficient to complete the reaction, usually from about 30 minutes to about 48 hours, more usually from about 1 hour to about 12 hours, most usually from about 1 hour to about 6 hours. This initial reaction, unless the catalyst is an alkali metal or alkaline earth metal hydroxide employed in stoichiometric quantities, produces a halohydrin amine intermediate which is then reacted with a basic acting compound to convert the vicinal halohydrin groups to epoxide groups. Reaction of the halohydrin amine intermediate and basic acting compounds in the presence or absence of a suitable solvent is typically conducted at a temperature from about 0° C. to about 100° C., more suitably from about 20° C. to 80° C., most suitably from about 25° C. to about 60° C.; and, at pressures suitably from about 30 mm Hg vacuum to about 100 psia, more suitably from about 45 mm Hg vacuum to about 50 psia, most suitably from about 60 mm Hg vacuum to atmospheric pressure; and, for a time sufficient to complete the dehydrohalogenation reaction, usually from about 10 minutes to about 12 hours, more usually from about 15 minutes to about 6 hours, most usually from about 20 minutes to about 1 hour. The resultant product is the alkylated glycidyl amine compound.

The amount of epihalohydrin that may be used in the reaction to prepare the alkylated glycidyl amine may be 0.5 moles or more, or 1.5 moles or more, or even 3 moles or more, or even 8 moles or more, or even further 10 moles or more, per 1 mole of the amine.

Suitable catalysts which can be employed to prepare the alkylated glycidyl amines include, for example, ammonium halides such as, for example, benzyltrimethylammonium chloride, benzyltrimethylammonium bromide, tetrabutylammonium chloride, tetrabutylammonium bromide, tetraoctylammonium chloride, tetraoctylammonium bromide, tetramethylammonium chloride, tetramethylammonium bromide, $La(NO_3)_2$ and combinations thereof.

Suitable basic acting compounds which can be employed to prepare the alkylated glycidyl amines include, for example, alkali metal or alkaline earth metal hydroxides, carbonates, bicarbonates and the like. Particularly suitable such compounds include, for example, sodium hydroxide, potassium hydroxide, lithium hydroxide, calcium hydroxide, barium hydroxide, magnesium hydroxide, manganese hydroxide, sodium carbonate, potassium carbonate, lithium carbonate, calcium carbonate, barium carbonate, magnesium carbonate, manganese carbonate, sodium bicarbonate, potassium bicarbonate, lithium bicarbonate, calcium bicarbonate, barium bicarbonate, magnesium bicarbonate, manganese bicarbonate, mixtures thereof and the like. Most preferred is sodium hydroxide or potassium hydroxide.

Suitable solvents which can be employed to prepare the alkylated glycidyl amine include, for example, alcohols, glycols, aliphatic hydrocarbons, aromatic hydrocarbons, glycol ethers, amides, sulfoxides, sulfone, combinations thereof and the like. Particularly suitable solvents include, for example, methanol, ethanol, isopropanol, hexane, heptane, octane, nonane, decane, toluene, xylene, ethylene glycol, propylene glycol, ethylene glycol methyl ether, ethylene glycol ethyl ether, ethylene glycol n-butyl ether, ethylene glycol phenyl ether, propylene glycol methyl ether, propylene glycol phenyl ether, tripropylene glycol methyl ether, diethylene glycol methyl ether, diethylene glycol ethyl ether, diethylene glycol n-butyl ether, diethylene glycol phenyl ether, butylene glycol methyl ether, N,N-dimethylformamide, N-methylpyrrolidinone, N,N-dimethylacetamide, dimethylsulfoxide, sulfolane, combinations thereof and the like. The solvent, if used, is usually employed in amounts from about 5 wt. % to about 95 wt. %, or from about 20 wt. % to about 60 wt. %, most suitably from about 30 wt. % to about 40 wt. %, where the wt. % is based upon the combined weight of solvent and epihalohydrin.

In general, the epoxy component may include at least about 40 wt. % of the alkylated glycidyl amine, where the wt. % is based on the total weight of the epoxy component. In other embodiments, the epoxy component may include at least about 50 wt. %, or at least about 60 wt. %, or at least about 70 wt. % or even at least about 80 wt. % of the alkylated glycidyl amine, where the wt. % is based on the total weight of the epoxy component. In still another embodiment, the epoxy component may include at least about 92.5 wt. %, or at least about 95 wt. %, or even at least about 97.5 wt. % or even at least about 99 wt. %, or even 99.9 wt. % of the alkylated glycidyl amine, where the wt. % is based on the total weight of the epoxy component. In yet a further embodiment, the epoxy component consists of the alkylated glycidyl amine.

In still another embodiment, the epoxy component may further include an epoxy resin. Examples of such epoxy resins are polyglycidyl ethers of a polyphenol including diglycidyl ethers of a diphenol such as, for example, resorcinol, catechol, hydroquinone, bisphenol, bisphenol A, bisphenol AP (1,1-bis(4-hydroxylphenyl)-1-phenyl ethane), bisphenol F, bisphenol K, tetramethylbiphenol, or mixtures of two or more thereof. Further examples include polyglycidyl ethers of polyglycols; epoxy novolac resins, including cresol-formaldehyde novolac epoxy resins, phenol-formaldehyde novolac epoxy resins and bisphenol A novolac epoxy resins; cycloaliphatic epoxides; tris(glycidyloxyphenyl) methane; tetrakis(glycidyloxyphenyl)ethane; oxazolidone-containing compounds; advanced epoxy-isocyanate copolymers; and non-alkylated glycidyl amines, including, but not limited to, tetraglycidylether of methylenedianaline or m-phenylenediamine, tetraglycidyl amine of fluorenediani-line, triglycidyl aminophenol and diglycidyl derivatives of aniline.

In one embodiment, the epoxy component may include less than about 60 wt. % of the epoxy resin, where the wt. % is based on the total weight of the epoxy component. In other embodiments, the epoxy component may include less than about 30 wt. %, or at less than about 20 wt. % of the epoxy resin, where the wt. % is based on the total weight of the epoxy component. In still another embodiment, the epoxy component may include less than about 7.5 wt. %, or less than about 5 wt. %, or less than about 2.5 wt. % or even less than about 1 wt. % or even still less than about 0.1 wt. % of the epoxy resin, where the wt. % is based on the total weight of the epoxy component.

As described above, the curable resin system also includes a curing component. In one embodiment, the curing component includes a phenylindane diamine. In a further embodiment, the phenylindane diamine is a compound having a structure

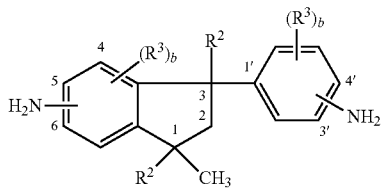

where $R^2$ is hydrogen or an alkyl group having from 1 to 6 carbon atoms; $R^3$ is independently hydrogen, halogen or an alkyl group having from 1 to 6 carbon atoms; and b is independently an integer of 1 to 4 and the amino group on the indane ring is at the 5 or 6 position.

The phenylindane diamines can comprise any combination of the isomeric or substituted isomeric phenylindane diamine compounds. For example, the phenylindane diamines can comprise from 0 mole % to 100 mole % of 5-amino-3-(4'-aminophenyl)-1,1,3-trimethylindane in combination with from 100 mole % to 0 mole % of 6-amino-3-(4'-aminophenyl)-1,1,3-trimethylindane. Further, either or both of these isomers can be substituted over the entire range from 0 to 100% by any of the substituted diamine isomers. Examples of such substituted diamine isomers are 5-amino-6-methyl-3-(3'-amino-4'-methylphenyl)-1,1,3-trimethylindane, 5-amino-3-(4'-amino-Ar',Ar'-dichlorophenyl)-Ar,Ar-dichloro-1,1,3-trimethylindane, 6-amino-(4'-amino-Ar',Ar'-dichloro-phenyl)-Ar,Ar-dichloro-1,1,3-trimethylindane, 4-amino-6-methyl-3(3'-amino-4'-methyl-phenyl)-1,1,3-trimethylindane and Ar-amino-3-(Ar'-amino-2',4'-dimethylphenyl)-1,1,3,4,6-pentamethylindane. The prefixes Ar and Ar' in the above formulae indicate indefinite positions for the given substituents in the phenyl rings.

Among the phenylindane diamines there can be mentioned those in which $R^2$ independently is hydrogen or methyl, and $R^3$ independently is hydrogen, methyl, chloro or bromo. In particular, suitable phenylindane diamines are those in which $R^2$ is hydrogen or methyl, and $R^3$ independently is hydrogen, methyl, chloro or bromo, and the amino groups are at positions 5 or 6 and at positions 3' or 4'. Because of relative availability, the phenylindane diamines which are particularly suitable include compounds wherein $R^2$ is methyl, each $R^3$ is hydrogen, and the amino groups are at positions 5 or 6 and at position 4'. These compounds are known as 5(6)-amino-3-(4'-aminophenyl)-1,1,3-trimethylindane (DAPI), having a structural formula

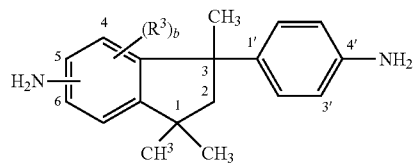

where the amino on the indane ring is at the 5 or 6 position.

The phenylindane diamines and methods for their preparation are disclosed in U.S. Pat. Nos. 3,856,752 and 3,983,092, which patents are fully incorporated by reference herein with respect to their disclosure pertaining to the preparation of such materials.

In general, the curing component comprising the phenylindane diamine and the epoxy component comprising the alkylated glycidyl amine are combined to form a reactive mixture in amounts such that at least 0.8 epoxy equivalents are provided to the reactive mixture per amine hydrogen equivalent. In another embodiment, the curing component comprising the phenylindane diamine and the epoxy component comprising the alkylated glycidyl amine are combined to form a reactive mixture in amounts such that at least 0.90 epoxy equivalents or at least 1.0 epoxy equivalents are provided to the reactive mixture per amine hydrogen equivalent. The epoxy component can be provided in large excess, such as up to 10 epoxy equivalents per amine hydrogen equivalent provided to the reactive mixture, but preferably there are no more than 2, more preferably no more than 1.25 and still more preferably no more than 1.10 epoxy equivalents provided per amine hydrogen equivalent.

In some embodiments, the curing component may optionally include at least one other curing agent in addition to the phenylindane diamine. In one particular embodiment, the optional curing agents are those which facilitate the curing of the epoxy component and, particularly, facilitate the ring opening polymerization of the alkylated glycidyl amine and optional epoxy resin.

Examples of the optional curing agents include aromatic and cycloaliphatic amines including, but not limited to, meta-xylenediamine, 1,3-(bisaminomethyl)cyclohexane, tricyclodecane diamine, norbornane diamine, 3,3' dimethylmethylene di(cyclohexylamine), methylene-di(cyclohexylamine), 1,2-cyclohexanediamine, isophoronediamine, meta-phenylenediamine, 4,4'-diaminodiphenylmethane, diaminodiphenylsulphone, diethyltoluenediamine, tetra-alkyl diaminodiphenylmethane, tetra-alkylated di(4-aminophenol)di-isopropylbenzene and mixtures thereof.

In another embodiment, the curing component may optionally include catalysts including imidazoles such as 2-methylimidazole; 2-ethyl-4-methylimidazole; 2-phenyl imidazole; tertiary amines such as triethylamine, tripropylamine, N,N-dimethyl-1-phenylmethaneamine and 2,4,6-tris((dimethylamino)methyl)phenol and tributyl amine; phosphonium salts such as ethyltriphenylphosphonium chloride, ethyltriphenylphosphonium bromide and ethyltriphenyl-phosphonium acetate; ammonium salts such as benzyltrimethylammonium chloride and benzyltrimethylammonium hydroxide; various carboxylic acid compounds and mixtures thereof.

Other optional additives which may be added to curable resin system to either the epoxy component and/or curing component include, but are not limited to, catalysts, diluents, impact modifiers, internal mold release agents, tougheners, dyes, pigments, antioxidants, fire retardants, thixotropic agents, flow control agents, adhesion promoters, light stabilizers, preservatives, short (up to about 6 inches) in length reinforcing fibers, non-fibrous particulate fillers including micron- and nanoparticles, wetting agents and mixtures thereof. In one embodiment, the curable resin system is substantially free of a polyether sulfone toughener. In another embodiment, the curable resin system is substantially free of water.

According to one embodiment, the additive(s), when present, may be included in the curable resin system in an amount in the range of between about 0.001 wt. % and about 40 wt. %, where the wt. % is based on the total weight of the epoxy component and the curing component.

In another embodiment, there is provided a process for forming a fiber-reinforced epoxy composite material, comprising:
a) mixing an epoxy component with a curing component to form a reactive mixture, wherein
the epoxy component contains an alkylated glycidyl amine obtained from the reaction of an epihalohydrin and an amine having at least two reactive hydrogens selected from the group consisting of an aliphatic amine, an alkyl aromatic amine, an alkyl aminophenol and a mixture thereof, and
the curing component contains a phenylindane diamine;
b) transferring the resulting reactive mixture into a mold that contains reinforcing fibers;
c) curing the reactive mixture in the mold at an elevated temperature to form a fiber-reinforced composite material in which the reinforcing fibers are embedded in a polymeric matrix formed by curing the reactive mixture; and
d) demolding the fiber-reinforced composite material.

Polymeric matrices are formed from the curable resin system of the present disclosure by mixing the epoxy component and curing component at proportions as described before and curing the resulting mixture. Either or both of the components can be preheated if desired before they are mixed with each other. It is generally necessary to heat the mixture to an elevated temperature to obtain a rapid cure. In a molding process such as the process for making molded composite materials described below, the reactive mixture is introduced into a mold, which may be, together with any reinforcing fibers and/or inserts as may be contained in the mold, preheated. The curing temperature may be, for example, from about 40° C. to about 190° C., or from about 50° C. to about 180° C., or even from about 60° C. to about 170° C. In another embodiment, the curing temperature may be, for example from about 65° C. to about 150° C., or from about 70° C. to about 135° C. or from about 80° C. to about 120° C. In still another embodiment the curing temperatures are governed by the onset of reaction as measured by Differential Scanning calorimetry (DSC). The onset of reaction is defined as the temperature at which the curable system undergoes sufficient exothermic reaction such that less heat is required to maintain the heat flow with respect to a reference. This curing onset temperature may be, for example from about 120° C. to about 190° C., or from about 130° C. to about 180° C. or more preferably from about 140° C. to about 180° C. Onset temperatures above 190° C. are not capable of achieving rapid low temperature curing and temperatures below 120° C. do not allow sufficient time to infuse parts with high quality.

In some embodiments, it is preferred to continue the cure until the resulting polymeric matrix attains a glass transition temperature in excess of the cure temperature. The glass transition temperature at the time of demolding is preferably at least 110° C., or at least 125° C., or even still at least 140° C. or further at least 150° C. An advantage of this disclosure is that such glass transition temperatures can be obtained with short curing times. This allows for short cycle times. Demold times at cure temperatures are typically 350 seconds or less, preferably are 300 seconds or less and more preferably 240 seconds or less. In some embodiments, the demold time at such cure temperatures is no more than 180 seconds or no more than 120 seconds.

In still other embodiments, the curable resin system exhibits a degree of cure of about 80% or higher when cured at the temperatures described before. In yet another embodiment, the curable resin system exhibits a degree of cure of about 85% or higher, or 90% or higher, when cured at the temperature described before. In still another embodiment it may be desired to further cure the composite material after demolding in a separate stage, such as in a heated oven, to reach a degree of cure above 90% or even above 95%.

As noted above, the curable resin system of the present disclosure is particularly useful for making fiber-reinforced composite materials by curing the system in the presence of reinforcing fibers. These composites are in general made by mixing the epoxy component with the curing component to form a reactive mixture, wetting the fibers with the reactive mixture, and then curing the reactive mixture at the temperatures described before in the presence of the reinforcing fibers.

The reinforcing fibers are thermally stable and have a degradation temperature, such that the reinforcing fibers do not degrade or melt during the curing process. Suitable fiber materials may include, for example, glass, quartz, polyamide resins, boron, carbon, wheat straw, hemp, sisal, cotton, bamboo and gel-spun polyethylene fibers.

The reinforcing fibers can be provided in the form of short (0.5 to 15 cm) fibers, long (greater than 15 cm) fibers or continuous rovings. The fibers can be provided in the form of a mat or other preform if desired, such mats or preforms may in some embodiments be formed by entangling, weaving and/or stitching the fibers, or by binding the fibers together using an adhesive binder. Preforms may approximate the size and shape of the finished composite material (or portion thereof that requires reinforcement). Mats of continuous or shorter fibers can be stacked and pressed together, typically with the aid of a tackifier, to form preforms of various thicknesses, if required.

Suitable tackifiers for preparing preforms include heat-softenable polymers such as described in, for example, U.S. Pat. Nos. 4,992,228, 5,080,851 and 5,698,318. The tackifier should be compatible with and/or react with the polymer phase of the composite so that there is good adhesion between the polymer and reinforcing fibers. The tackifier may contain other components, such as one or more catalysts, a thermoplastic polymer, a rubber, or other modifiers.

A sizing or other useful coating may be applied onto the surface of the fibers before they are introduced into the mold. A sizing often promotes adhesion between the cured resin and the fiber surfaces.

The composite material may be formed in a mold. In such a case, the reinforcing fibers may be introduced into the mold before introducing the epoxy component/curing component reactive mixture. This is normally the case when a fiber preform is used. The fiber preform is placed into the mold, the mold is closed, and the reactive mixture is then introduced into the mold where it penetrates between the fibers in the preform, fills the cavity, and then cures to form the composite material.

Alternatively, the fibers (including a preform) can be deposited into an open mold, and the reactive mixture can be sprayed, poured or injected onto the preform and into the mold. After the mold is filled in this manner, the mold is closed and the reactive mixture cured. An example of a process of this type is gap compression resin transfer molding, in which the mold containing the fibers is kept open with a gap which may be, for example, 10% to 100% or more of the original cavity thickness. The gap permits lower flow resistance, which makes mold filling easier and facilitates penetration of the reactive mixture around and between the fibers.

Short fibers can be introduced into the mold with the reactive mixture. Such short fibers may be, for example, blended with the epoxy component or curing component (or both) prior to forming the reactive mixture. Alternatively, the short fibers may be added into the reactive mixture at the same time as the epoxy component and curing component are mixed, or afterward but prior to introducing the reactive mixture into the mold.

Alternatively, short fibers can be sprayed into a mold. In such cases, the reactive mixture can also be sprayed into the mold, at the same time or after the short fibers are sprayed in. When the fibers and reactive mixture are sprayed simultaneously, they can be mixed together prior to spraying. Alternatively, the fibers and reactive mixture can be sprayed into the mold separately but simultaneously. The sprayed materials may be spread and/or leveled using a doctor blade or similar device before closing the mold and performing the cure. In a process of particular interest, long fibers are chopped into short lengths and the chopped fibers are sprayed into the mold, at the same time as or immediately before the reactive mixture is sprayed in. Mesh materials often function as flow promoters.

A wet compression process can be used, in which the reactive mixture is applied directly to a fiber preform or stack without injection by spraying or by laying it down as "bands" of system, which are being fed through a wider slit die, which could have a width of 1 cm to 50 cm or more. Sufficient material is applied to reach the desired fiber volume content in the final composite material. The reactive mixture can be applied to the fibers inside an open mold, or outside the mold. The reactive mixture may instead be applied to the center layer of a build-up, by wetting a layer of fibers with the reactive mixture and then putting a second layer of fibers onto the wetted surface, therefore sandwiching the resin layer in between two layers of fibers. The fiber mats can be made out of non-crimped fiber buildups, of woven fabric, of random fiber build-ups or preforms. If the reactive mixture is applied to the fibers outside of the mold, it is typically applied at a somewhat low temperature, to prevent premature curing, and to reduce the viscosity of the reactive mixture so it does not drip off the fibers before they are transferred into the mold. The wetted preform is then placed into the lower half of a hot mold, the mold is closed and the material cured under compression.

Composite materials made in accordance with the present disclosure may have fiber contents of at least 30 volume %, or at least 40 volume %, or even at least 45 volume % up to 50 volume %, such as up to 55 volume %, or even up to 60 volume %.

The mold may contain, in addition to the reinforcing fibers, one or more inserts. Such inserts may function as reinforcements, may function as flow promoters, and in some cases may be present for weight reduction purposes. Examples of such inserts include, for example, wood, plywood, metals, various polymeric materials, which may be foamed or unfoamed, such as polyethylene, polypropylene, another polyolefin, a polyurethane, polystyrene, a polyamide, a polyimide, a polyester, polyvinylchloride and the like, various types of composite materials, and the like, that do not become distorted or degraded at the temperatures encountered during the molding step.

The reinforcing fibers and core material, if any, may be enclosed in a bag or film such as is commonly used in vacuum assisted processes.

The mold and the preform (and any other inserts, if any) may be heated to the curing temperature or some other useful elevated temperature prior to contacting them with the reactive mixture. The mold surface may be treated with an external mold release agent, which may be solvent or water-based.

The particular equipment that is used to mix the components of the reactive mixture and transfer the mixture to the mold is not considered to be critical to the present disclosure, provided the reactive mixture can be transferred to the mold before it attains a high viscosity or develops significant amounts of gels. The process of the present disclosure is amenable to RTM, VARTM, RFI, gap compression resin transfer molding and SCRIMP processing methods and equipment (in some cases with equipment modification to provide the requisite heating at the various stages of the process), as well as to other methods such as wet compression.

The mixing apparatus used to mix the epoxy component and curing component can be of any type that can produce a highly homogeneous reactive mixture (and any optional components that are also mixed in at this time). Mechanical mixers and stirrers of various types may be used. Two preferred types of mixers are static mixers and impingement mixers.

In some embodiments, the mixing and dispensing apparatus is an impingement mixer. Mixers of this type are commonly used in so-called reaction injection molding processes to form polyurethane and polyurea moldings. The epoxy component and curing component (and other additives which are mixed in at this time) are pumped under pressure into a mixing head where they are rapidly mixed together. Operating pressures in high pressure machines may range from 1,000 to 29,000 psi or higher (6.9 to 200 MPa or higher), although some low pressure machines can operate at significantly lower pressures. The resulting mixture is then preferably passed through a static mixing device to provide further additional mixing, and then transferred into the mold cavity. The static mixing device may be designed into the mold. This has the advantage of allowing the static mixing device to be opened easily for cleaning.

In certain specific embodiments, the epoxy component and curing component are mixed as just described, by pumping them under pressure into a mixing head. Impingement mixing may be used. The operating pressure of the incoming epoxy component and curing component streams may range from a somewhat low value (for example, from about 1 to about 6.9 MPa) or a high value (such as, for example, from 6.9 to 200 MPa). The resulting reactive mixture is then introduced into the mold at a somewhat low operating pressure (such as up to 5 MPa or up to about 1.035 MPa). In such embodiments, the reactive mixture is typically passed through a static mixer before entering the mold. Some or all of the pressure drop between the mix head and the mold injection port often will take place through such a static mixer. One preferred apparatus for conducting the process is a reaction injection molding machine, such as is commonly used to processes large polyurethane and polyurea moldings.

In other embodiments, the reactive mixture is mixed as before, and then sprayed into the mold. Temperatures are maintained in the spray zone such that the temperature of the hot reactive mixture is maintained as described before.

The mold is typically a metal mold, but it may be ceramic or a polymer composite provided the mold is capable of withstanding the pressure and temperature conditions of the molding process. The mold contains one or more inlets, in liquid communication with the mixer(s), through which the reactive mixture is introduced. The mold may contain vents to allow gases to escape as the reactive mixture is injected.

The mold is typically held in a press or other apparatus which allows it to be opened and closed, and which can apply pressure on the mold to keep it closed during the filling and curing operations. The mold or press is provided with means by which heat or cooling can be provided.

In some embodiments of the foregoing process, the molded composite is demolded in no more than 90 minutes, preferably from 30 to 60 minutes, more preferably from 15 to 45 minutes, after the curable resin system has been introduced into the mold. In such processes, the introduced reactive mixture flows around and between the reinforcing fibers and fills the mold and then cures in the mold, preferably forming a polymer having a glass transition temperature of at least 150° C. (or at least 160° C. or even at least 170° C.) within 90 minutes, more preferably within 30 to 60 minutes, after the reactive mixture has been introduced into the mold.

The process of the present disclosure is useful to make a wide variety of composite materials, including various types of aerospace and automotive parts. Examples of the aerospace parts include those described before while the automotive parts include vertical and horizontal body panels, automobile and truck chassis components, and so-called "body-in-white" structural components.

In other embodiments, the curable resin system may be used as a coating to form a resin coated substrate, as an adhesive for bonding one or more like or dissimilar substrates together or as an encapsulant to encapsulate electronic components.

EXAMPLES

Table 1 below depicts cure onset, glass transition temperature and percent cure conversion after a 1 hour cure at 150° C. for various curable resin systems as measured by differential scanning calorimetry (DSC). Also shown are isothermal viscosity and relative latency properties. As used here, the term "latency" is defined as the time it takes for the viscosity of a curable resin system to double from its initial viscosity. Non-alkylated glycidyl amines are compared to alkylated glycidyl amines cured with 5(6)-amino-3-(4'-aminophenyl)-1,1,3-trimethylindane (DAPI), isophoronediamine (IPDA), 4,4'-methylenebis(2-isopropyl-6-methaniline (M-MIPA) and 4,4'-methylenebis(2,6-diethylaniline) (M-DEA). Comparative examples 1, 1a and 2 are non-alkylated glycidyl amines cured with either a cycloaliphatic amine, IPDA or aromatic amines such as M-MIPA and M-DEA. Comparative examples 2a and 3 are alkylated glycidyl amines cured with IPDA. Inventive examples 1b, 1c, 2b and 3a are alkylated glycidyl amines cured with DAPI. The results for the comparative examples demonstrate that these curable resins systems either lack the necessary reactivity to develop sufficient cure of at least 80% at 150° C. or below and/or lack the necessary latency by at least a ratio of 50% to 190% as compared to the alkylated glycidyl amines cured with DAPI.

TABLE 1

| | Comparative Example 1 % | Comparative Example 1a % | Example 1b % | Example 1c % | Comparative Example 2 % | Comparative Example 2a % | Example 2b % | Comparative Example 3 % | Example 3a % |
|---|---|---|---|---|---|---|---|---|---|
| Resin Composition | | | | | | | | | |
| TGMDA | 59.4 | 63.2 | | | 73.1 | | | | |
| TGDADEPM | | | 65.9 | | | 75.4 | 70.0 | | |
| TGDADMPM | | | | 62.8 | | | | | |
| TGEPAP | | | | | | | | 70.6 | 60.3 |
| TGEMePAP | | | | | | | 30.0 | | |
| Curative Composition | | | | | | | | | |
| DAPI | | 36.8 | 34.1 | 37.3 | | | 56.6 | | 39.7 |
| M-MIPA | 13.5 | | | | | | | | |
| M-DEA | 27.1 | | | | | | | | |
| IPDA | | | | | | 26.9 | 24.6 | | 29.4 |
| TOTAL | 100.0 | 100.0 | 100.0 | 100.1 | 100.0 | 100.0 | 156.6 | 100.0 | 100.0 |
| DSC, fresh, 10° C./min | | | | | | | | | |
| Onset, ° C. | 213 | 160 | 186 | 174 | 100 | 125 | 162 | 77.5 | 140 |
| Enthalpy, J/g | 456 | 406 | 457 | 431 | 497 | 472 | 469 | 595 | 507 |
| Peak, ° C. | 242 | 183 | 219 | 206 | 128 | 162 | 204 | 113 | 169 |
| Cure schedule, 1 hr @ 150° C. DSC | | | | | | | | | |
| Tg, ° C. | N/A | 184 | 198 | 194 | 179 | 136 | 194 | 177 | 185 |
| Enthalpy, J/g | N/A | 45 | 41 | — | 56 | N/A | 48 | 58 | 55 |
| DoC, % | Uncured | 88.92 | 91.03 | — | 88.73 | <50% | 89.8 | 90.25 | 89.15 |

TABLE 1-continued

| | Comparative Example 1 % | Comparative Example 1a % | Example 1b % | Example 1c % | Comparative Example 2 % | Comparative Example 2a % | Example 2b % | Comparative Example 3 % | Example 3a % |
|---|---|---|---|---|---|---|---|---|---|
| Isothermal viscosity | | | | | | | | | |
| Latency @ 70° C. (minutes) | >240 | 80 | >160 | >120 | | | >160 | | |
| Latency @ 60° C. (minutes) | | | | | | | | | 90 |
| Latency @ 25° C. (minutes) | | | | | 54 | 135 | | 31 | |
| Comparative Ratio | — | — | >2.0:1.0 | >1.5:1.0 | — | 2.5:1.0 | >2.0:1.0 | — | 2.9:1.0 |

TGMDA: Tetraglycidylether of methylenedianaline
TGDADEPM: N,N,N',N'-tetraglycidyl-4,4'-diamino-3,3'-diethyldiphenylmethane
TGDADMPM: N,N,N',N'-tetraglycidyl-4,4'-diamino-3,3'-dimethyldiphenylmethane
TGEPAP: Triglycidylether of para-aminophenol
TGEMePAP: Triglycidyl ether of 2-methyl para-aminophenol
DAPI: 5(6)-amino-3-(4'-aminophenyl)-1,1,3-trimethylindane
M-MIPA: 4,4'-Methylenebis(2-isopropyl-6-methaniline)
M-DEA: 4,4'-methylenebis(2,6-diethylaniline)
IPDA: Isophoronediamine Although making and using various embodiments of the present disclosure have been described in detail above, it should be appreciated that the present disclosure provides many applicable inventive concepts that can be embodied in a wide variety of specific contexts. The specific embodiments discussed herein are merely illustrative of specific ways to make and use the invention, and do not delimit the scope of the invention.

What is claimed is:

1. A process for forming a fiber-reinforced epoxy composite material, comprising:
   a) mixing an epoxy component with a curing component and a catalyst comprising a phosphonium salt, or an ammonium salt, or mixtures thereof to form a curable resin system, wherein the epoxy component contains an alkylated glycidyl amine obtained from the reaction of an epihalohydrin and an alkyl aromatic amine, and the curing component contains a phenylindane diamine, wherein the alkylated glycidyl amine has two to five epoxy groups in its molecule and is present in amounts of at least 60 wt % based on the total weight of the epoxy component;
   b) transferring the curable resin system into a mold that contains reinforcing fibers;
   b) curing the curable resin system in the mold at an elevated temperature to form a fiber-reinforced composite material in which the reinforcing fibers are embedded in a polymeric matrix formed by curing the curable resin system and, wherein the polymeric matrix attains a glass transition temperature of at least 150° C. and a degree of cure of 85% or higher upon curing at 150° C.;
   c) demolding the fiber-reinforced composite material.

2. A fiber-reinforced composite material produced according to the method of claim 1.

3. A curable resin system comprising (i) an epoxy component comprising an alkylated glycidyl amine obtained from the reaction of an epihalohydrin and an alkyl aromatic amine and (ii) a curing component comprising a phenylindane diamine and a catalyst comprising a phosphonium salt, or an ammonium salt, or mixtures thereof, wherein the alkylated glycidyl amine has two to five epoxy groups in its molecule and is present in amounts of at least 60 wt % based on the total weight of the epoxy component, and the curable resin system obtains a degree of cure of 85% or higher upon curing at 150° C. and a glass transition temperature in excess of 150° C.

4. The curable resin system of claim 3, wherein the alkyl aromatic amine is an alkyl aromatic polyamine.

5. The curable resin system of claim 3, wherein the alkyl aromatic amine is an alkyl aminophenol having the structure

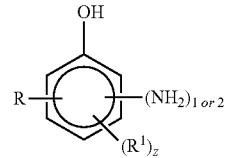

where R is an alkyl group having from 1 to 12 carbon atoms, $R^1$ is an alkyl group having from 1 to 12 carbon atoms and z is an integer of 0 or 1.

6. The curable resin system of claim 5, wherein R is methyl, ethyl, propyl or isopropyl and $R^1$ is methyl, ethyl, propyl, isopropyl or butyl.

7. The curable resin system of claim 5, wherein the alkyl aminophenol is a compound having the structure

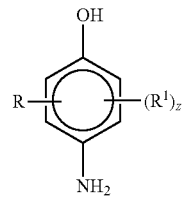

where R, $R^5$ and z are defined in claim 5.

8. The curable resin system of claim 7, wherein z is 1 and R and $R^1$ are ortho to the OH group.

9. The curable resin system of claim 7, wherein z is 1 and R and $R^1$ are ortho to the $NH_2$ group.

10. The curable resin system of claim 3, wherein the phenylindane diamine is a compound having a structure

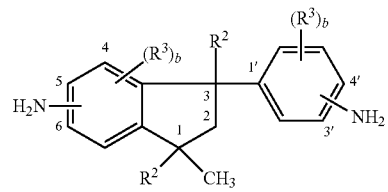

wherein each $R^2$ is independently hydrogen or an alkyl group having from 1 to 6 carbon atoms; each $R^3$ is independently hydrogen, halogen or an alkyl group having from 1 to 6 carbon atoms; and b is independently an integer of 1 to 4 and the amino group on the indane ring is at the 5 or 6 position.

11. The curable resin system of claim 10, wherein the phenylindane diamine comprises from 0 mole % to 100 mole % of 5-amino-3-(4'-aminophenyl)-1,1,3-trimethylindane in combination with from 100 mole % to 0 mole % of 6-amino-3-(4'-aminophenyl)-1,1,3-trimethylindane.

* * * * *